Sept. 23, 1969   J. B. WALKER, JR   3,468,266
FUEL FIRING
Filed April 23, 1968
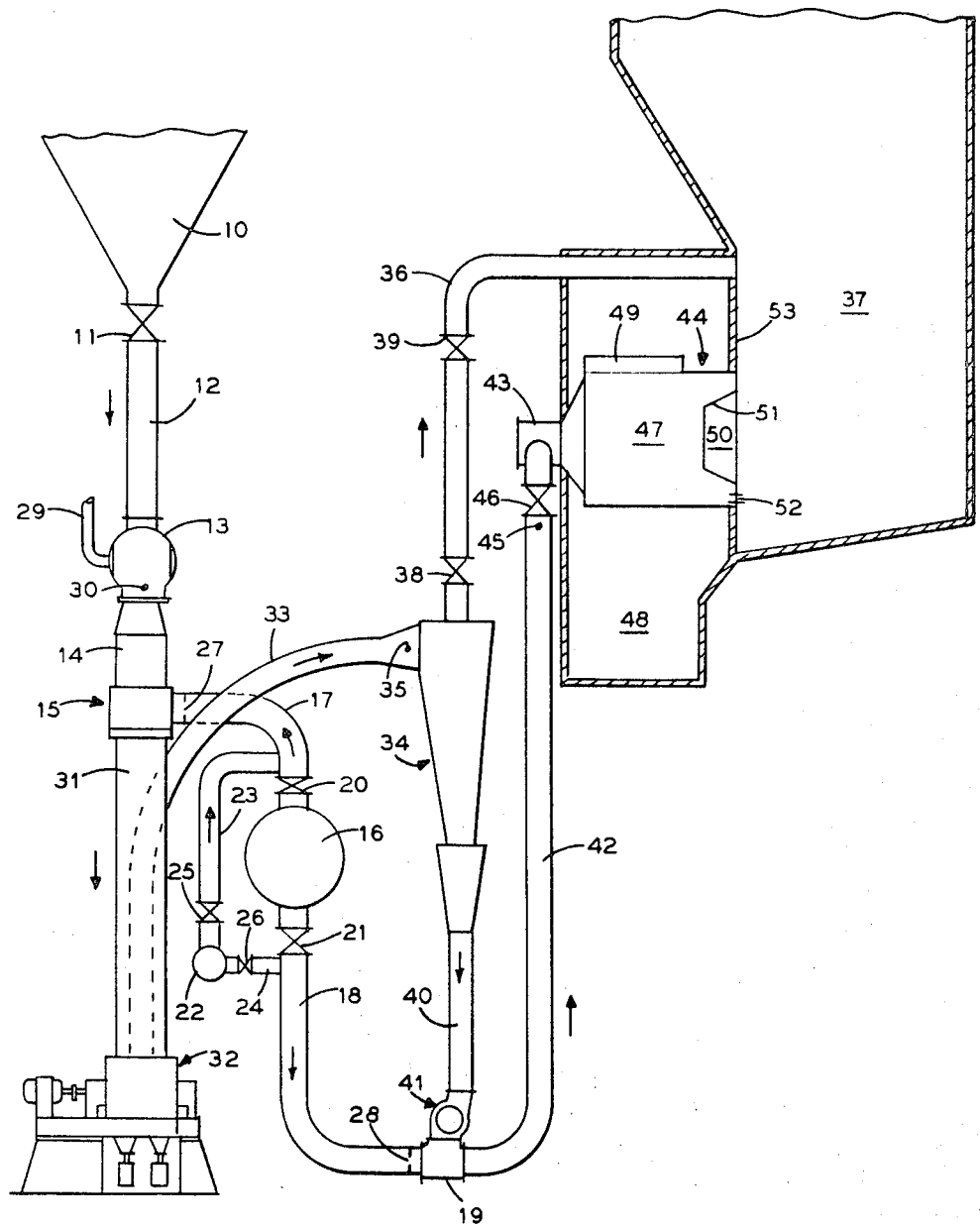
INVENTOR.
James B. Walker, Jr.
BY
J. Maguire
ATTORNEY 3,468,266
FUEL FIRING
James B. Walker, Jr., Barberton, Ohio, assignor to The Babcock & Wilcox Company, New York, N.Y., a corporation of New Jersey
Filed Apr. 23, 1968, Ser. No. 723,467
Int. Cl. F23k 1/00
U.S. Cl. 110—106　　　　　　　　　　　　　　6 Claims

ABSTRACT OF THE DISCLOSURE

A fuel firing system capable of succesfully burning high moisture content, low heat value lignitic fuels. The system includes a centrifugal mechanical collector located between a coal crusher and a cyclone furnace combustion chamber. Preheated air is mixed with the fuel stream ahead of the crusher to effect evaporation of a portion of the moisture in the fuel ahead of the mechanical collector. The fuel-air mixture is separated, with the moisture-laden air being vented directly to the secondary furnace of the steam generating unit associated with the system, while the partially dried fuel is fed to the cyclone furnace. This results in a substantial increase in the adiabatic gas temperature within the cyclone furnace chamber thus helping to maintain the normal mean gas temperature in the chamber substantially above the fuel ash fusion temperature as required for good slag tapping conditions.

---

This invention relates generally to the handling and burning of solid fuels and more particularly to an improved method of firing high moisture content lignite fuels.

In recent years, there has been a growing interest in the utilization of lignitic fuels for electric power generation. The interest was aroused by the fact that very large reserves of these fuels exist in several regions throughout the world and can be mined at comparatively low cost.

Heretofore, lignites with 36 percent by weight or less moisture content, and a higher heating value of 7000 B.t.u. per lb. or more as fired, and having suitable ash fusion characteristics have been burned successfully in cyclone furnace type combustion chambers equipped with conventional direct-fired, gravity-feed coal crushers or direct-fired, air-lift coal crushers.

It is the object of this invention to provide a fuel firing system capable of successfully burning lignites having more than 36 percent moisture content, and a higher heat value of less than 7000 B.t.u. per lb. as fired, and having suitable ash fusion characteristics. In the present invention preheated air introduced into the fuel stream ahead of the crusher is used to dry the coal and convey it to a centrifugal type mechanical collector downstream of the crusher where the moisture-laden air is separated from the partially dried coal. The moisture-laden air is vented directly to the secondary furnace of the steam generating unit associated with the system. This means of handling the moisture-laden air is a feature of the invention in that it results in a substantial increase in the adiabatic gas temperature in the cyclone furnace since the adverse dilution of the gases by moisture during inception of the combustion process is eliminated. These concomitant effects have the following significant advantages. Firstly, they make it possible for the unit to efficiently burn lignites having in excess of 36 percent moisture by weight and less than 7000 B.t.u. per lb. of higher heat value by maintaining normal mean gas temperatures in the combustion chamber over a wide load range substantially above the fuel ash fusion temperature as required for good slag tapping conditions. Secondly, they help promote the early ignition of the fuel thus insuring that substantially all of the fuel is burned within the combustion chamber. Thirdly, they allow operation without the continued support of a supplementary fuel such as gas and oil thus effecting additional economies in fuel and equipment costs.

In the accompanying drawing there is shown a diagrammatic sectional elevation of the fuel firing system embodying our invention.

The fuel firing system shown in the illustrative embodiment is intended for use with a high-moisture, low heat value fuel, such as lignite.

In the drawing, there is shown a bunker 10 arranged to receive and store fuel, the outlet end of bunker 10 is provided with a shut-off valve 11 and connects by way of conduit 12 to the inlet end of a drag-link or belt type regulable feeder 13. An auxiliary fan, not shown, supplies seal air to feeder 13 through pipe 29. A high temperature alarm 30 is located in the feeder discharge, the outlet of which is connected to the conduit 14 for discharge into mixing bustle 15.

A primary air duct 16 receives preheated air at superatmospheric pressure from the air-side outlet of the air preheater, not shown. The primary air duct discharge branches into conduits 17 and 18. The conduit 17 connects to the mixing bustle 15 and includes a shut-off valve 20 and a flow rate measuring device, such as orifice 27. The conduit 18 connects to the mixing T 19 and includes a shut-off valve 21 and a flow rate measuring device, such as orifice 28. A tempering air duct 22 receives cold air at superatmospheric pressure from the forced draft fan outlet, not shown. The tempering air duct branches into conduits 23 and 24, each of which includes shut-off valves 25 and 26, and these conduits are connected into conduits 17 and 18, respectively.

The conduit 31 connects the discharge end of the mixing bustle 15 to the inlet end of a hammer type crusher 32. The crusher discharges into the centrifugal type mechanical collector 34 by way of conduit 33. A temperature measuring device 35 is located at the outlet end of conduit 33.

The centrifugal type mechanical collector 34 is provided with upper and lower end outlets. The vent pipe 36 connects the upper end outlet of mechanical collector 34 for discharge into secondary furnace 37 and includes a shut-off valve 38 and a regulable valve 39. The lower end outlet of mechanical collector 34 discharges into the conduit 40 which connects to the inlet end of the star type rotary seal feeder 41.

The mixing T 19 has two inlet ends adapted to receive the discharges from the feeder 41 and the conduit 18, respectively. The mixing T 19 has its outlet connected to coal-air lift line or conduit 42, for discharge into the cyclone furnace type combustion chamber 44 which includes a scroll section 43 and a barrel section 47, both of which are of substantially circular cross section. The conduit 42, which includes a temperature measuring device 45 and a shut-off valve 46 has its outlet end connected to the scroll section. Scroll 43 is smaller in diameter than the contiguous barrel section 47 and is arranged at the front end of cyclone furnace combustion chamber 44 to open concentrically into the barrel section. Scroll 43 includes an inlet, not shown, for tangential introduction of tertiary air. Barrel 47 is formed of fluid cooled tubes with a refractory lined inner surface and includes a secondary air opening 49 receiving combustion air from the windbox enclosure 48. The rear end of the cyclone combustion chamber 44 is partly closed by a fluid cooled tubular wall 53 and has a gas outlet 50 in the form of a re-entrant throat 51 arranged therein concentric with the barrel section. A slag outlet 52 is formed in the wall 53 at a position below the throat 51 for the continuous discharge of molten slag. The wall 53 forms part of the fluid cooled boundary walls of the furnace chamber 37. It is to be understood that the portions of fluid cooled tubes herein described are suitably connected into the circulation system of a steam generating unit in a manner well known in the art.

In the operation of the fuel firing system, the cyclone combustion chamber 44 is first heated to a predetermined temperature by an auxiliary oil or gas burner, not shown, before firing the lignite fuel. Once stable lignite ignition and combustion have been established, the auxiliary burner is removed from operation.

Preheated air at superatmospheric pressure is supplied to the windbox chamber 48 and to the primary air duct 16. Cold air at superatmospheric pressure is supplied to the tempering duct 22. The preheated air leaving the primary air duct 16 is divided into a first stream of air being discharged into conduit 17 and a second stream of air being discharged into conduit 18. The rate of discharge of preheated air into conduits 17 and 18 is controlled by regulable valves 20 and 21, respectively. The outlet of tempering air duct 22 is divided into two conduits, a conduit 23 which discharges cold air into conduit 17 to control the temperature of the coal-air mixture being conveyed to the mechanical collector 34 and the conduit 24 which discharges cold air into conduit 18 to control the temperature of the coal-air mixture entering the scroll 43. The rate of discharge of cold air into conduits 23 and 24 is controlled by regulable valves 25 and 26, respectively. The flow rates of the first and second streams of air are determined by the measuring devices 27 and 28 located at the outlet of conduits 17 and 18, respectively.

The high-moisture lignite fuel is stored in the bunker 10. When the shut-off valve 11 is open, the fuel discharges via conduit 12 onto feeder 13. The fuel feed-rate to the firing system is controlled by regulating the feeder speed. The lignite leaving the feeder is conveyed through conduit 14 into the mixing bustle 15.

The first stream of preheated air conveyed in conduit 17, discharges into the mixing bustle 15 where it comes in intimate contact with the lignite to thereby evaporate a portion of its moisture. The air performs a dual function of drying the lignite and conveying it through this portion of the fuel firing system. The fuel-air mixture travels through the conduit 31 into crusher 32 where it is crushed to a size consistent with use in the cyclone furnace type combustion chamber. The crushed fuel is swept-out by the fluidizing air stream and carried through conduit 33 into the mechanical collector 34. Here the moisture-laden air is separated from the fuel particles and discharged through vent pipe 36 into the furnace 37. The rate and pressure of the vented discharge may be controlled with regulable valve 39 and shut-off valve 38 prevents the backflow of furnace gases when the system is inoperative. The partially dried coal particle outflow from the mechanical collector 34 is discharged through conduit 40 into the rotary seal feeder 41 from where they are discharged into a mixing T 19 where they combine with the incoming second stream of air to be swept-up through conduit 42 into the scroll section 43 of the cyclone combustion chamber 44. The second stream of air has the added effect of further drying the coal particles before introduction in the cyclone combustion chamber.

The fuel-air mixture and the tertiary air are tangentially introduced into the scroll 43, issuing in highly turbulent flow from the scroll and causing the fuel particles and air so introduced to move axially of the combustion chamber towards the gas discharge thereof, through a helical path of travel along the circumferential wall of the barrel section 47. Preheated secondary air is admitted through the tangentially oriented opening 49 to mix with and sustain the combustion of the swirling lignite particles. The gas temperature within the cyclone barrel section is maintained above the fusion temperature of the ash which, when released from the burning coal, forms a molten slag covering over the walls of the barrel section 47. Larger fuel particles which did not have time to complete combustion while in suspension are entrapped by the molten layer of slag and burned in situ as a result of the scrubbing action of the high velocity combustion gases. When an equilibrium slag covering of the barrel wall has been attained the molten slag then flows out of the opening 52 and collects in the bottom of furnace 37 and is then discharged into a slag tank, not shown.

A series of tests incorporating the present invention were run on an experimental steam generating unit equipped with a 5 ft. diameter cyclone combustion chamber while burning a fuel such as Glen harold lignite having a moisture content of 39 percent by weight and a higher heat value of 6810 B.t.u. per lb. as fired and having suitable ash fusion temperature characteristics such as a viscosity of 250 poises at 2100° F. and an ash fusion temperature of 2380° F. Based on heat balance calculations, 5 percent of the moisture content in the fuel was evaporated by the first stream of preheated air and vented to the furnace, an additional 9 percent was evaporated by the second stream of preheated air before introduction of the lignite into the cyclone combustion chamber. The following is a typical preferred distribution of the air delivered to the system taken as a percentage of the total air flow required for a cyclone combustion chamber operating at maximum capacity: 75–80 percent as secondary air admitted tangentially at the barrel, 15–20 percent as the second stream of air or primary air and 5 percent as tertiary air admitted tangentially at the scroll with 15 percent as the first stream of air or primary air vented directly to the furnace. The approximate lignite feed rate was 14,700 lb. per hour and the efficiency of the mechanical collector averaged 99.5 percent. The highest lignite dust concentration in the vented air was 0.007 oz. per cu. ft. Supplementary fuel was not used during the normal operation of this experimental unit. Combustion performance during the entire series of tests was good and visual inspection indicated that early ignition of the fuel was established in the cyclone combustion chamber and that the slag tapping characteristic was good.

What is claimed is:

1. In a system for firing high-moisture content ash containing solid fuel having a crusher, a mechanical collector, a cyclone furnace combustion chamber of circular cross-section and a secondary furnace, the method of operating said system comprising contacting the solid fuel with a first stream of preheated air and allowing the air to evaporate moisture from the fuel, introducing the fuel and air mixture into the crusher, directing the crushed fuel and air mixture to the mechanical collector, separating the fuel and air mixture in the mechanical collector into fuel particles and moisture-laden air, discharging the fuel particle outflow of the mechanical collector into a second stream of preheated air, introducing the fuel particle and air mixture into one end of the combustion chamber, and while maintaining a normal mean gas temperature in the chamber above the ash fusion temperature, causing the fuel particles and air so introduced to move axially of the combustion chamber towards the gas discharge end thereof through a helical path of travel along the circumferential wall of the combustion chamber of sufficient length to effect combustion of the fuel and release of the ash in a condition to form a sticky surface on the circumferential wall to which fuel particles adhere and are scrubbed by the combustion gases, causing the combustion gases to flow through the gas discharge end and into the furnace, discharging the ash from the combustion chamber in a molten condition through the lower part of the chamber and into the furnace, and venting the moisture-laden air from the mechanical collector into the secondary furnace to reduce the moisture introduced into the combustion chamber with the fuel particles so that normal mean gas temperature in the combustion chamber is maintained above the ash fusion temperature.

2. The method according to claim 1 wherein said fuel is coal, and the first and second streams of air are supplied from a common duct.

3. The method according to claim 2 wherein the air stream temperature is substantially greater than the coal temperature.

4. The method according to claim 3 wherein the temperature of the first stream of air is the same as the temperature of the second stream of air.

5. The method according to claim 3 wherein the temperature of the first stream of air differs from the temperature of the second stream of air.

6. The method according to claim 2 wherein the air supply is at superatmospheric pressure, the first stream of air carries the crushed coal from the crusher to the mechanical collector and the second stream of air carries the coal particle outflow from the mechanical collector to the combustion chamber.

References Cited

FOREIGN PATENTS

| | | |
|---|---|---|
| 672,597 | 5/1952 | Great Britain. |
| 729,086 | 5/1955 | Great Britain. |
| 735,497 | 8/1955 | Great Britain. |

KENNETH W. SPRAGUE, Primary Examiner